United States Patent
Stroebel

(10) Patent No.: US 10,549,777 B2
(45) Date of Patent: Feb. 4, 2020

(54) CONTROL SYSTEM FOR STEERING A TRACTOR VEHICLE WITH A TRAILER

(71) Applicant: Bayerische Motoren Werke Aktiengesellschaft, Munich (DE)

(72) Inventor: Michael Stroebel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/127,391

(22) Filed: Sep. 11, 2018

(65) Prior Publication Data

US 2019/0077454 A1    Mar. 14, 2019

(30) Foreign Application Priority Data

Sep. 12, 2017   (DE) .......................... 10 2017 216 088

(51) Int. Cl.
*G08B 21/00*     (2006.01)
*B62D 13/06*    (2006.01)
(Continued)

(52) U.S. Cl.
CPC ............. *B62D 13/06* (2013.01); *B60W 30/09* (2013.01); *B62D 15/025* (2013.01);
(Continued)

(58) Field of Classification Search
CPC .... B62D 13/06; B62D 15/027; B62D 15/025; B62D 15/026; B62D 1/22; B60W 30/09;
(Continued)

(56) References Cited

U.S. PATENT DOCUMENTS

| | | | |
|---|---|---|---|
| 6,292,094 B1 * | 9/2001 | Deng ..................... | B62D 7/159 340/431 |
| 7,109,854 B2 * | 9/2006 | Dobler ................... | G08G 1/165 340/435 |

(Continued)

FOREIGN PATENT DOCUMENTS

| | | |
|---|---|---|
| DE | 101 28 792 A1 | 11/2002 |
| DE | 101 54 612 A1 | 5/2003 |

(Continued)

OTHER PUBLICATIONS

German-language Search Report issued in counterpart German Application No. 10 2017 216 088.8 dated May 24, 2018 with Partial English translation (13 pages).

*Primary Examiner* — Anh V La
(74) *Attorney, Agent, or Firm* — Crowell & Moring LLP

(57) ABSTRACT

A control system that steers a tractor vehicle with a trailer has at least one electronic control unit which has interfaces to a first sensor device for sensing the current bend angle, a second sensor device for sensing the required driving space of the tractor-trailer combination, and a third sensor device for sensing the driving space which is present. The control unit also has a collision prediction unit for comparing the required driving space with the driving space which is present while taking into account the current bend angle, and a collision prevention unit which determines, through interaction with the collision prediction unit, a bend angle which is the maximum permissible one for preventing a collision. The collision prevention unit indicates a setting of a bend angle which exceeds the maximum permissible bend angle as critical in terms of a collision and prevents the setting or permits it only after a predefined delay.

10 Claims, 1 Drawing Sheet

(51) Int. Cl.
*B60W 30/09* (2012.01)
*B62D 15/02* (2006.01)

(52) U.S. Cl.
CPC ....... *B62D 15/027* (2013.01); *B60W 2520/22* (2013.01); *B60W 2550/10* (2013.01)

(58) Field of Classification Search
CPC ......... B60W 2550/10; B60W 2520/22; B60W 30/18036; B60W 2710/18; B60W 2710/20; B60W 10/18; B60W 10/20; G06T 7/80; B60D 1/245
USPC .................. 340/431, 671; 701/41, 42, 70
See application file for complete search history.

(56) References Cited

U.S. PATENT DOCUMENTS

| | | | |
|---|---|---|---|
| 9,533,683 B2 * | 1/2017 | Lavoie | B60W 10/18 |
| 2004/0181338 A1 | 9/2004 | Dobler et al. | |
| 2007/0027581 A1 * | 2/2007 | Bauer | B60T 8/1708 |
| | | | 701/1 |
| 2007/0067081 A1 * | 3/2007 | Ton | B60Q 9/008 |
| | | | 701/41 |
| 2014/0277941 A1 * | 9/2014 | Chiu | B62D 13/06 |
| | | | 701/41 |
| 2017/0140228 A1 * | 5/2017 | Lang | G08G 1/167 |
| 2018/0354553 A1 | 12/2018 | Stroebel | |

FOREIGN PATENT DOCUMENTS

| | | |
|---|---|---|
| DE | 10 2012 009 703 A1 | 11/2013 |
| DE | 10 2012 207 647 A1 | 11/2013 |
| DE | 10 2014 005 681 A | 10/2015 |
| DE | 10 2017 209 980 A1 | 12/2018 |

\* cited by examiner

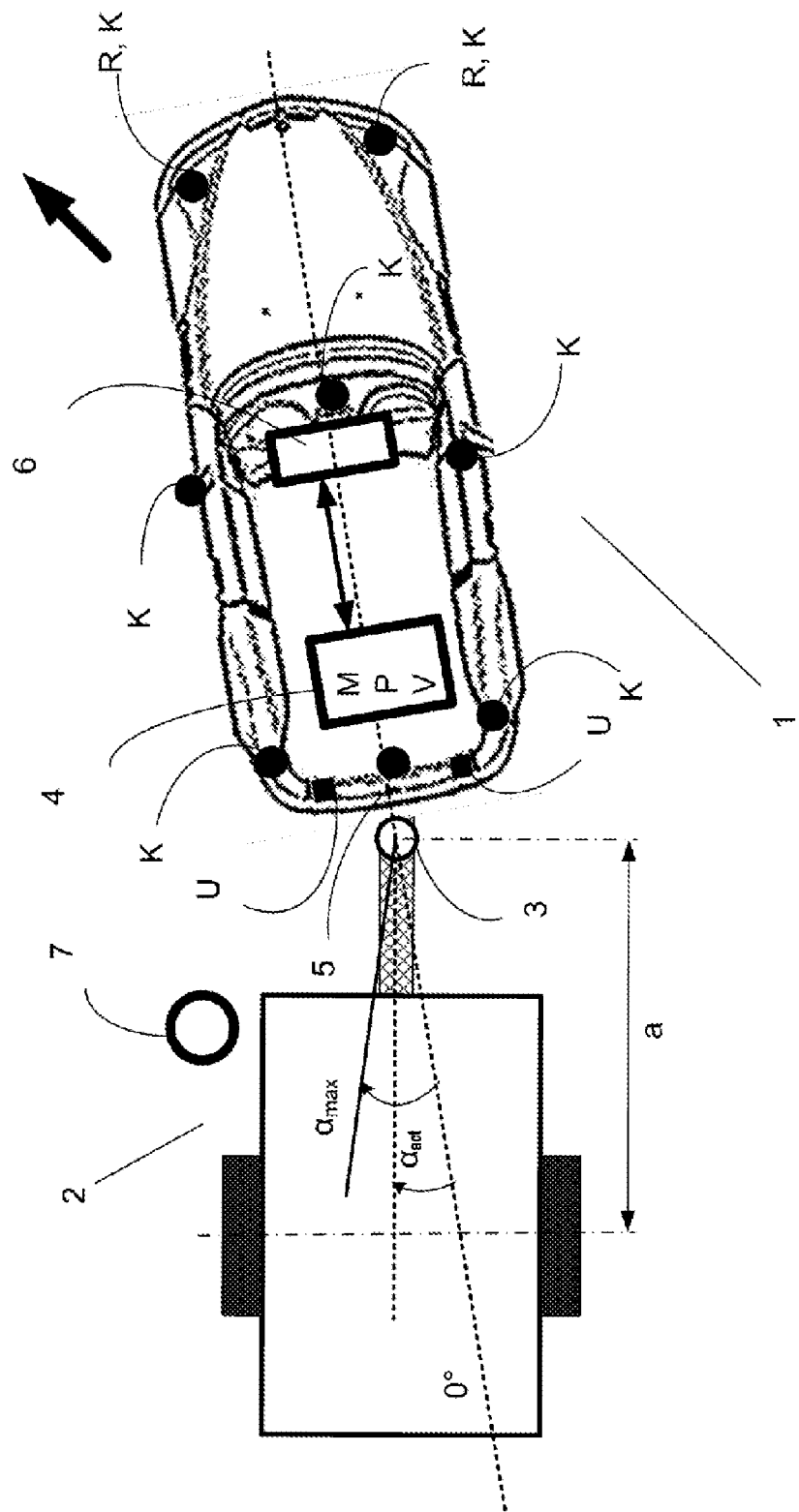

CONTROL SYSTEM FOR STEERING A TRACTOR VEHICLE WITH A TRAILER

CROSS REFERENCE TO RELATED APPLICATION

This application claims priority under 35 U.S.C. § 119 from German Patent Application No. 10 2017 216 088.8, filed Sep. 12, 2017, the entire disclosure of which is herein expressly incorporated by reference.

BACKGROUND AND SUMMARY OF THE INVENTION

The invention relates to a driver-assisting control system for manual or at least partially automated steering of a tractor vehicle with a trailer, said control system comprising an electronic control unit.

Reverse travel with a trailer which is moved by a tractor vehicle via a trailer coupling requires some practice since the trailer tends to "veer out". For example, DE 101 54 612 A1 discloses a method in which it has been demonstrated on a test vehicle, composed of a tractor vehicle and a two-axle trailer, that it is possible to support the driver of the vehicle during this difficult task. In this context, what is referred to as an active "by-wire" steering system can be installed in the tractor vehicle, which steering system is composed of a steering handle and a wheel angle adjuster which is actuated by a computer. In the case of forward travel, the driver actuates the wheel angle adjuster by means of the steering handle and in this way steers the tractor vehicle. In the case of reverse travel (i.e. in the shunting mode or parking mode) the driver of the vehicle does not steer the tractor vehicle directly but rather predefines the setpoint course of the trailer by means of the steering handle. That is to say the driver of the vehicle steers, as it were, the trailer about a virtual point which is fixed to the trailer. An electronic control unit (computer) then calculates the necessary steering lock values at the tractor vehicle in order to keep the trailer on the desired course and actuates the wheel angle adjuster of the tractor vehicle accordingly. The driver therefore steers the trailer directly with the steering handle.

It has proven particularly advantageous here if the actuation of the wheel angle adjuster of the tractor vehicle is carried out by way of an at least partially automated closed-loop control system which receives information about the location or position of the trailer in relation to the tractor vehicle via a suitable sensor system. The driver can be integrated into the closed-loop control circuit with his inputs at the steering handle.

However, it is not only possible for an at least partially automatic correction for the steering lock value to be fed directly into a suitable steering system of the tractor vehicle, which steering system influences the steering lock value of the steerable wheels independently of or in addition to the prescription of the driver of the vehicle, but also for the correction for the steering lock value to be indicated to the driver of the vehicle. That is to say with such a distance measuring sensor system on tractor vehicles which do not have an active (for example "by-wire") steering system which permits additional, manual steering interventions which are independent of the driver of the vehicle, the distance information is used at least to provide the driver of the vehicle with suitable indications as to the way in which he should make corrections at his steering wheel or his steering handle. In the simplest case, in the case of reverse travel with the distance sensors a collision warning can be issued, i.e. given a correspondingly large angle α between the longitudinal axes of the tractor vehicle and trailer the driver of the vehicle is alerted to the threat of a collision between the two.

DE 10 2012 207 647 A1 is intended to disclose how the accuracy of a driver assistance system for reversing a tractor-trailer combination, in particular composed of a two-track motor vehicle with a trailer, can be increased. For this purpose, according to this document, when said action recommendation is produced or when the transverse guidance and/or longitudinal guidance of the motor vehicle, which is brought about by the driver assistance system, occurs, further information, such as the axle geometry of the trailer, specifically its number of axles, drawbar length, track width, overall length and/or overall width, are also taken into account in addition to the bend angle. The overall length of the tractor-trailer combination is known to the assistance system with this further information, since the overall length of the tractor motor vehicle inclusive of the trailer coupling can easily be stored in a memory.

In the control system which is described in DE 10 2017 209 980 and which has the purpose of steering a tractor-trailer combination (=tractor vehicle with trailer) with at least one electronic control unit, with a sensor device for sensing the bend angle of the tractor-trailer combination (=angle between the longitudinal axis of the tractor vehicle and longitudinal axis of the trailer) and with a display unit, the control unit comprises a memory area for storing a maximum reversible bend angle, and/or a memory area for storing an upper bend angle change threshold value, and/or a memory area for storing a left-hand bend angle range and a right-hand bend angle range with respect to the zero line corresponding to a straight tractor-trailer combination, and a functional unit which is configured to output an action recommendation for forward travel on the display unit and/or which is configured to carry out autonomously executed forward travel, if the presence of at least one defined situation with respect to the bend-angle-related values stored in the memory area is detected by evaluation of the sensor device.

DE 101 28 792 A1 discloses a collision protection means for tractor-trailer combinations in which, in order to avoid collisions of a vehicle with obstacles, distance values between the vehicle and obstacles in the surroundings are acquired and the driving space which is present is calculated from these distance values. Furthermore, values relating to the current movement (speed, direction of travel, deceleration, etc.) of the vehicle are additionally acquired. These values are used, in conjunction with values of the dimensions of the vehicle, to calculate the driving space required to carry on the travel. Subsequently, a comparison is carried out between the driving space which is present and the driving space which is required. When the required driving space extends beyond the driving space which is present, measures for avoiding a collision are initiated, wherein the values of the dimensions of the vehicle are read out from a memory which is configured in such a way that a plurality of different vehicle contours are stored therein.

The present invention is based on the abovementioned prior art and addresses the problem of improving further a driver assistance system for a tractor-trailer combination with respect to collision protection.

This problem is solved by a control system and method in accordance with embodiments of the invention.

The control system of the invention for (manual or at least partially automated) steering a tractor vehicle with a trailer, both during reverse travel and during forward travel and with both remote control and also controlled from the tractor vehicle, has at least one electronic control unit which has interfaces to:

a first sensor device for sensing the current bend angle, a second sensor device for sensing the required driving space of the tractor-trailer combination, and a third sensor device for sensing the driving space which is present.

The control unit also comprises:

a collision prediction unit for comparing the required driving space with the driving space which is present while taking into account the current bend angle, and a collision prevention unit which determines, through interaction with the collision prediction unit, a bend angle which is the maximum permissible one for preventing a collision, and which collision prevention unit indicates a setting of a bend angle which exceeds the maximum permissible bend angle as critical in terms of a collision and prevents said setting or permits it only after a predefined delay.

The invention is based on the following realizations taking the abovementioned prior art as a starting point.

In the case of a trailer assistance system function, the setpoint bend angle of the trailer which is to be maneuvered is basically predefined by the driver by means of an operator control action. The system compares the setpoint bend angle with the actual bend angle and adjusts it in at least partially automated fashion by means of the movement of the vehicle or assists the driver during manual steering.

The control of the tractor-trailer combination is carried out with the manual prescription of the bend angle by the driver. The driver must therefore prescribe the path of the tractor-trailer combination himself and must accordingly watch out for the threat of collisions of the trailer or tractor vehicle.

The driver therefore has the additional task in the complex trailer maneuvering operation of watching out for the threat of collisions with the tractor vehicle and/or trailer and must estimate when a desired bend angle can be adjusted. If the driver uses the trailer assistant in the remote mode and is standing behind the tractor-trailer combination, his view of the tractor vehicle can be blocked by the body of the trailer. It is therefore not possible for the driver to check for the threat of a collision.

According to the invention, the surroundings of the tractor vehicle and of the trailer are sensed by the sensor system (ultrasonic system, camera, radar, lidar, . . . ) which, under certain circumstances, is present in any case. On the basis of these data, corresponding measures can be derived. In particular, the bend angle requirement which is predefined by the driver is not permitted, is permitted to a limited degree or is only permitted after a delay if said bend angle request would give rise to a collision. The bend angle which is the maximum possible one for preventing a collision is then defined by the maneuvering space (driving space) which is present for the tractor vehicle with the trailer.

The driver can therefore concentrate more on guiding the trailer.

Other objects, advantages and novel features of the present invention will become apparent from the following detailed description of one or more preferred embodiments when considered in conjunction with the accompanying drawing.

BRIEF DESCRIPTION OF THE DRAWING

The sole FIGURE schematically illustrates an exemplary embodiment of the invention showing the components of the control system.

DETAILED DESCRIPTION OF THE DRAWING

The single FIGURE illustrates a tractor-trailer combination composed of a tractor vehicle 1 and a trailer 2, wherein the tractor vehicle 1 has an electronic control unit 4 and preferably a display-operator control unit 6.

The control unit 4 contains interfaces to:
(i) a first sensor device 5 for sensing the current bend angle $\alpha_{act}$ of the tractor-trailer combination 1 and 2,
(ii) a second sensor device M and 5 for sensing the required driving space of the tractor-trailer combination 1 and 2, and
(iii) a third sensor device K, R, U and 5 for sensing the driving space which is present.

The first sensor device 5 can be a camera which is mounted on the rear of the tractor vehicle 1.

The second sensor device can be composed of a memory M and a camera 5 and can therefore acquire information such as the geometry of the trailer and tractor vehicle as well as the length of the drawbar.

The third sensor device can be composed of various surroundings-sensing sensors such as cameras K and 5, ultrasonic sensors U and/or radar sensors R. Such surroundings-sensing sensors can also be mounted on the trailer 2.

The control unit 4 also comprises:
(a) a collision prediction unit P for comparing the required driving space with the driving space which is present while taking into account the current bend angle $\alpha_{act}$, and
(b) a collision prevention unit V which determines, through interaction with the collision prediction unit P, a bend angle $\alpha_{max}$ which is the maximum permissible one for preventing a collision, and which collision prevention unit V indicates a setting of a bend angle which exceeds the maximum permissible bend angle $\alpha_{max}$ as critical in terms of a collision (e.g. by means of the display-operator control unit 6) and prevents said setting (e.g. by means of an automatic hard braking function) or permits it only after a predefined delay.

By means of corresponding programming of the control unit 4, the latter can execute at least one of the following functions:
(1) when the maximum permissible bend angle $\alpha_{max}$ is exceeded, the tractor vehicle 1 is braked automatically or is operated only with a maximum permissible speed (e.g. by means of corresponding drive interventions and/or braking interventions).
(2) as the current bend angle $\alpha_{act}$ increasingly approaches the maximum permissible bend angle $\alpha max$, the tractor vehicle 1 is operated with a decreasing speed.
(3) when the driving space which is present is sensed, a differentiation is made between mobile and immobile obstacles, and the predefined delay is determined as a function of the presence of mobile obstacles.
(4) when the driving space which is present is sensed, a person detection system is activated. When persons 7 are detected either the exceeding of the maximum permissible bend angle $\alpha_{max}$ is prohibited or the tractor vehicle is automatically braked hard at least until the person 7 has moved out of the required driving space.

These and similar functions can also be combined with one another as desired.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for steering a tractor vehicle with a trailer, comprising:
    at least one electronic control unit which has interfaces to:
    a first sensor device for sensing the current bend angle of the tractor-trailer combination,
    a second sensor device for sensing a required driving space of the tractor-trailer combination, and
    a third sensor device for sensing the driving space which is present,
    wherein the control unit further comprises:
    a collision prediction unit for comparing the required driving space with the driving space which is present while taking into account the current bend angle, and
    a collision prevention unit which determines, through interaction with the collision prediction unit, a bend angle which is the maximum permissible one for preventing a collision, and which collision prevention unit indicates a setting of a bend angle which exceeds the maximum permissible bend angle as critical in terms of a collision and prevents said setting or permits it only after a predefined delay.

2. The control system as claimed in claim 1, wherein when the maximum permissible bend angle is exceeded, the tractor vehicle is braked automatically or is operated only with a maximum permissible speed.

3. The control system as claimed in claim 1, wherein as the current bend angle increasingly approaches the maximum permissible bend angle, the tractor vehicle is operated with a decreasing speed.

4. The control system as claimed in claim 1, wherein when the driving space which is present is sensed, a differentiation is made between mobile and immobile obstacles, and wherein the predefined delay is determined as a function of the presence of mobile obstacles.

5. The control system as claimed in claim 1, wherein when the driving space which is present is sensed, a person detection system is activated, and wherein when persons are detected either the exceeding of the maximum permissible bend angle is prohibited or the tractor vehicle is automatically braked hard.

6. A method of steering a tractor vehicle with a trailer forming a tractor-trailer combination, the method comprising the acts of:
    sensing, using a first sensor, a current bend angle of the tractor-trailer combination;
    sensing, using a second sensor, a required driving space of the tractor-trailer combination;
    sensing, using a third sensor, a driving space that is presently available;
    comparing, using a collision prediction unit, the required driving space with the driving space presently available while factoring into account the current bend angle;
    determining, using a collision prevention unit, a bend angle which is a maximum permissible bend angle to prevent a collision; and
    indicating, using the collision prevention unit, a setting of the bend angle which exceeds the maximum permissible bend angle as critical and preventing said setting of the bend angle which exceeds the maximum permissible bend angle or permitting said setting only after a predefined delay.

7. The method as claimed in claim 6, wherein when the maximum permissible bend angle is exceeded, the tractor vehicle is braked automatically or is operated only with a maximum permissible speed.

8. The method as claimed in claim 6, wherein as the current bend angle increasingly approaches the maximum permissible bend angle, the tractor vehicle is operated with a decreasing speed.

9. The method as claimed in claim 6, wherein when the driving space which is present is sensed, a differentiation is made between mobile and immobile obstacles, and wherein the predefined delay is determined as a function of the presence of mobile obstacles.

10. The method as claimed in claim 6, wherein when the driving space which is present is sensed, a person detection system is activated, and wherein when persons are detected either the exceeding of the maximum permissible bend angle is prohibited or the tractor vehicle is automatically braked hard.

* * * * *